(12) United States Patent
Hemphill et al.

(10) Patent No.: US 9,625,023 B2
(45) Date of Patent: Apr. 18, 2017

(54) TORQUE CONVERTER DAMPER WITH SHUDDER CONTROL

(71) Applicant: SCHAEFFLER TECHNOLOGIES AG & CO. KG, Herzogenaurach (DE)

(72) Inventors: Jeffrey Hemphill, Copley, OH (US); Michael G. Swank, Shreve, OH (US); Edmund Maucher, Jeomesville, OH (US); Ashi Uppal, Troy, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 742 days.

(21) Appl. No.: 13/942,815

(22) Filed: Jul. 16, 2013

(65) Prior Publication Data

US 2014/0021000 A1 Jan. 23, 2014

Related U.S. Application Data (60) Provisional application No. 61/673,974, filed on Jul. 20, 2012.

(51) Int. Cl.
*F16H 45/02* (2006.01)
*F16F 15/121* (2006.01)

(52) U.S. Cl.
CPC .......... *F16H 45/02* (2013.01); *F16F 15/1215* (2013.01); *F16H 2045/0236* (2013.01); *F16H 2045/0263* (2013.01)

(58) Field of Classification Search
CPC .............. F16F 15/1336; F16F 15/1215; F16H 2045/0236; F16H 2045/0263; F16H 45/02; F16H 2045/0205; F16H 2045/0221; F16H 2045/0284
See application file for complete search history.

(56) References Cited

U.S. PATENT DOCUMENTS

| | | | | |
|---|---|---|---|---|
| 5,070,974 A | * | 12/1991 | Kirkwood | F16F 15/1215 192/208 |
| 6,176,785 B1 | * | 1/2001 | Geislinger | F16F 15/1215 464/100 |
| 7,367,440 B2 | | 5/2008 | Abusamra et al. | |
| 8,033,370 B2 | * | 10/2011 | Degler | F16F 15/12393 192/206 |

OTHER PUBLICATIONS

Freitag et al., "The Clutch System of the Future", Schaeffler Group 9th Schaeffler Symposium, Apr. 2010, Publisher Schaeffler Technologies GmbH & Co. KG, pp. 49-50.

* cited by examiner

*Primary Examiner* — Terry Chau
(74) *Attorney, Agent, or Firm* — Chester Paul Maliszewski (57) ABSTRACT

A tuned damper for a torque converter includes a piston plate with a pivot ring, an inertia ring at least partially rotatable in a circumferential direction relative to the piston plate, and a resilient element fixed to the inertia ring and frictionally engaged with the piston plate pivot ring. In some example embodiments, the pivot ring includes a pair of radially extending tabs, the resilient element includes a radially-extending leaf spring fixed to a slide roll, and an outer circumference of the slide roll is clamped by the pivot ring tabs. In an example embodiment, the pivot ring tabs each include respective distal bent segments extending toward one another to limit radial displacement of the slide roll. In an example embodiment, an inertia of the inertia ring and a torsional spring rate of the resilient element are selected so that a natural frequency of the inertia ring is less than a shudder frequency.

17 Claims, 9 Drawing Sheets

TORQUE CONVERTER DAMPER WITH SHUDDER CONTROL

FIELD

The invention relates generally to a damper for a torque converter, and more specifically to a damper for a torque converter including an inertia ring for shudder control.

BACKGROUND

Centrifugally actuated clutches are known from U.S. Pat. No. 7,367,440 to AbuSamra et al., for example. A chatter absorber is known from "The clutch system of the future" by Freitag et al. published in *9th Schaeffler SYMPOSIUM* 2010.

BRIEF SUMMARY

Example aspects broadly comprise a tuned damper for a torque converter including a piston plate with a pivot ring, an inertia ring at least partially rotatable in a circumferential direction relative to the piston plate, and a resilient element fixed to the inertia ring and frictionally engaged with the piston plate pivot ring. In some example embodiments, the pivot ring includes a pair of radially extending tabs, the resilient element includes a radially-extending leaf spring fixed to a slide roll, and an outer circumference of the slide roll is clamped by the pivot ring tabs. In an example embodiment, the pivot ring tabs each include respective distal bent segments extending toward one another to limit radial displacement of the slide roll. In an example embodiment, an inertia of the inertia ring and a torsional spring rate of the resilient element are selected so that a natural frequency of the inertia ring is less than a shudder frequency.

In some example embodiments, the tuned damper includes a first ball, a first clutch plate with a circumferential ring, and a ball ramp assembly. The first ball is disposed axially between the piston plate and the inertia ring. The ball ramp assembly has a ball ramp disposed on the inertia ring and/or the first clutch plate circumferential ring and a second ball disposed in the second ball ramp radially between the inertia ring and the first clutch plate circumferential ring. In an example embodiment, the piston plate includes a radial tab drivingly engaged with the first clutch plate circumferential ring.

In some example embodiments, the ball ramp assembly is arranged to apply an axial force to the piston plate through the first ball when the inertia ring rotates relative to the first clutch plate. In an example embodiment, the tuned damper has a second clutch plate disposed axially between the first clutch plate and the piston plate. The piston plate axial force clamps the second clutch plate between the first clutch plate and the piston plate. In an example embodiment, the tuned damper includes a turbine rotatably connected to the piston plate by leaf springs.

Other example aspects broadly comprise a torque converter with a turbine and a tuned damper. The tuned damper includes a piston plate rotatably connected with the turbine and including a pivot ring, an inertia ring, and a radial leaf spring fixed to the inertia ring and frictionally engaged with the piston plate pivot ring. In an example embodiment, the turbine is rotatably connected to the piston plate by leaf springs. In some example embodiments, the pivot ring includes first and second radially extending tabs, the radial leaf spring is fixed to a slide roll, and the slide roll is disposed circumferentially between and frictionally engaged with the first and second tabs.

In some example embodiments, the torque converter includes a first ball disposed axially between the piston plate and the inertia ring, a first clutch plate including an circumferential ring, and a ball ramp assembly. The ball ramp assembly has a ball ramp disposed on the inertia ring and/or the first clutch plate circumferential ring and a second ball disposed in the second ball ramp radially between the inertia ring and the first clutch plate circumferential ring. In an example embodiment, the piston plate includes a radial tab drivingly engaged with the first clutch plate circumferential ring. In some example embodiments, the ball ramp assembly is arranged to apply an axial force to the piston plate through the first ball when the inertia ring rotates relative to the first clutch plate. In an example embodiment, the torque converter has a second clutch plate disposed axially between the first clutch plate and the piston plate. The piston plate axial force clamps the second clutch plate between the first clutch plate and the piston plate.

In some example embodiments, the torque converter has a cover including a clutch carrier, a first clutch plate drivingly engaged with the clutch carrier, and a second clutch plate disposed axially between the first clutch plate and the clutch cover, and including an axial tab drivingly engaged with the piston plate. In an example embodiment, the torque converter has a first ball disposed axially between the piston plate and the inertia ring and a ball ramp assembly. The ball ramp assembly includes a ball ramp disposed on the inertia ring and/or the second clutch plate axial tab, and a second ball disposed in the second ball ramp radially between the inertia ring and the second clutch plate axial tab.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
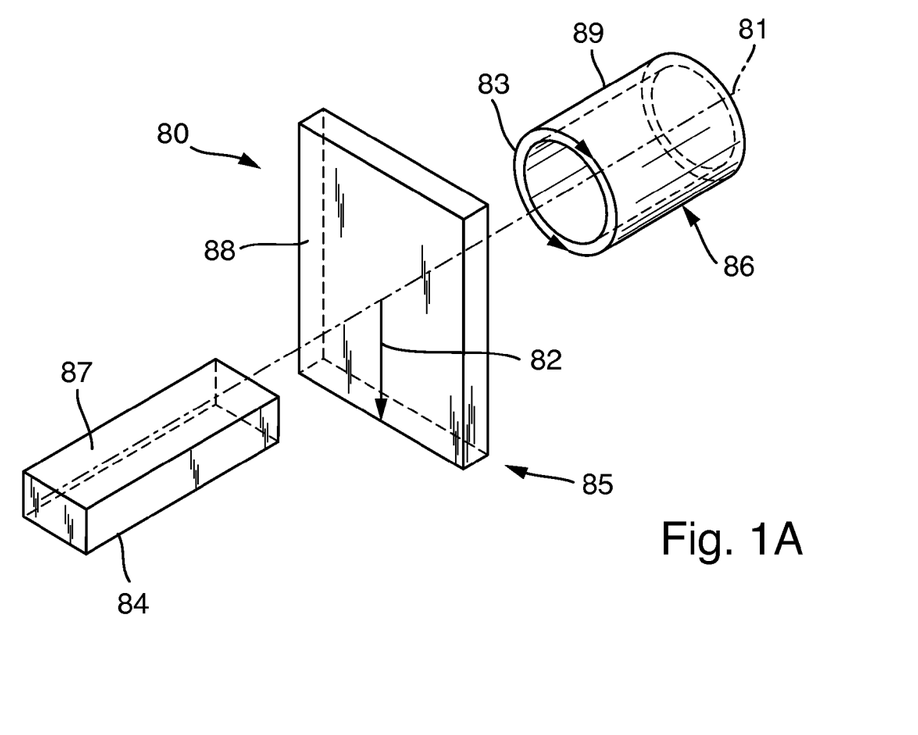
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
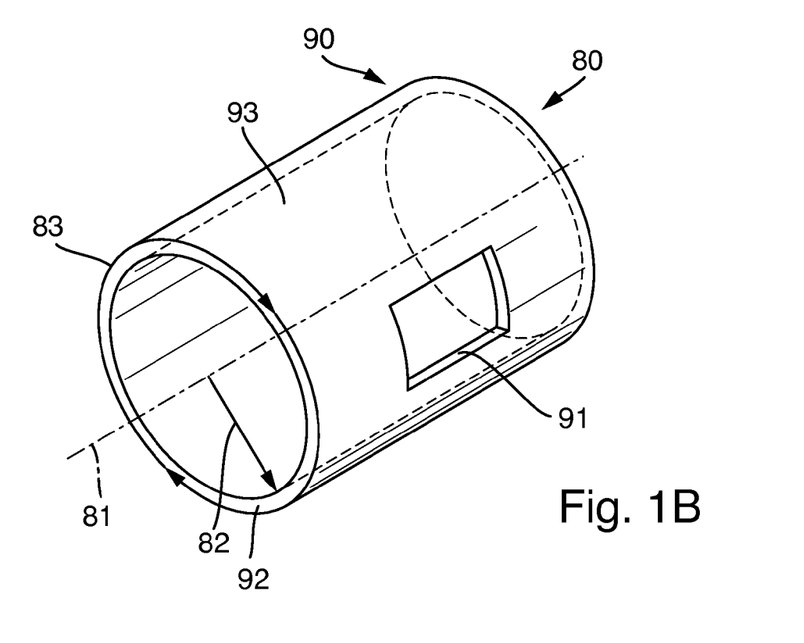
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
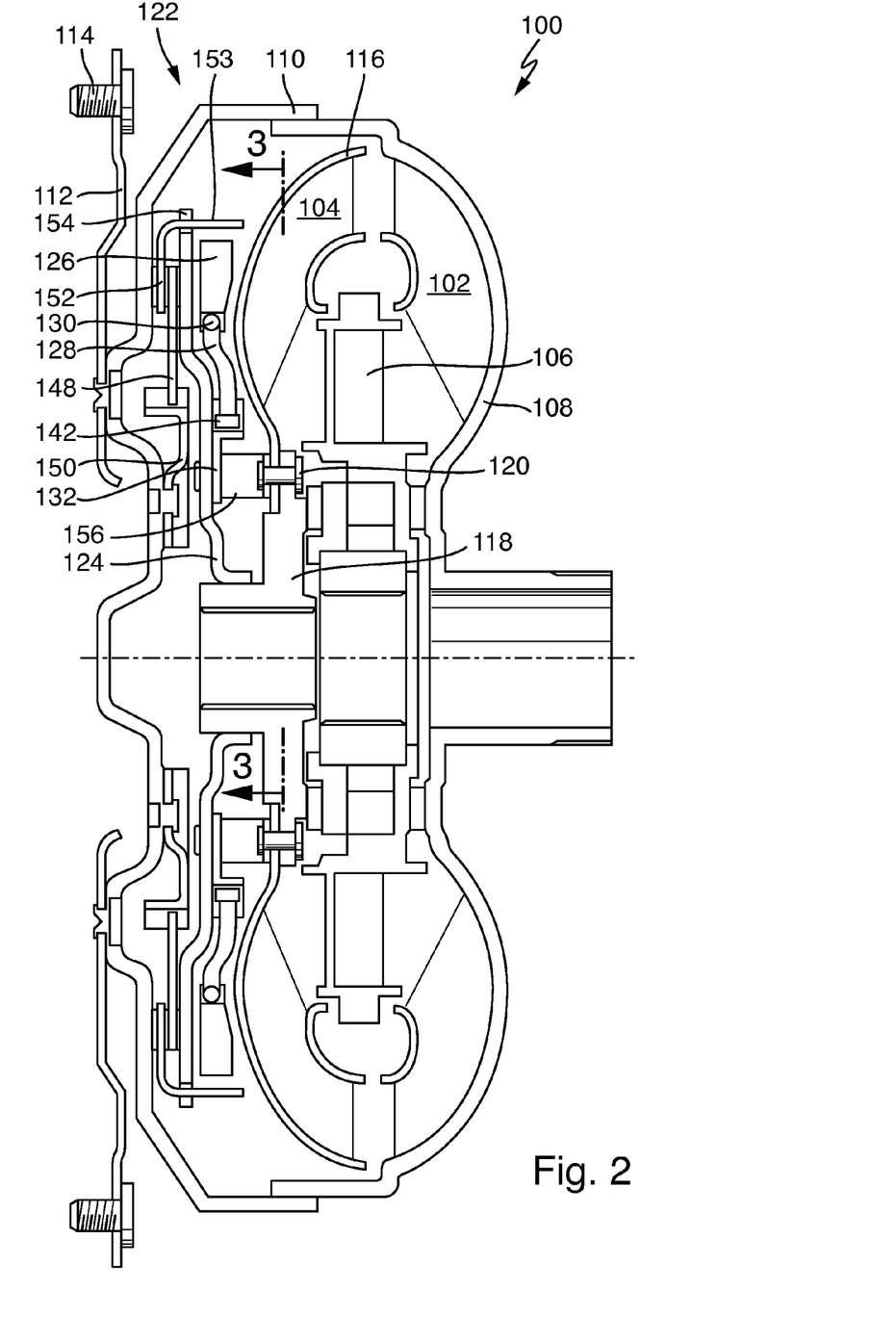
FIG. 2 is a cross section view of a torque converter including an inertia ring according to an example aspect.
Figure 3:
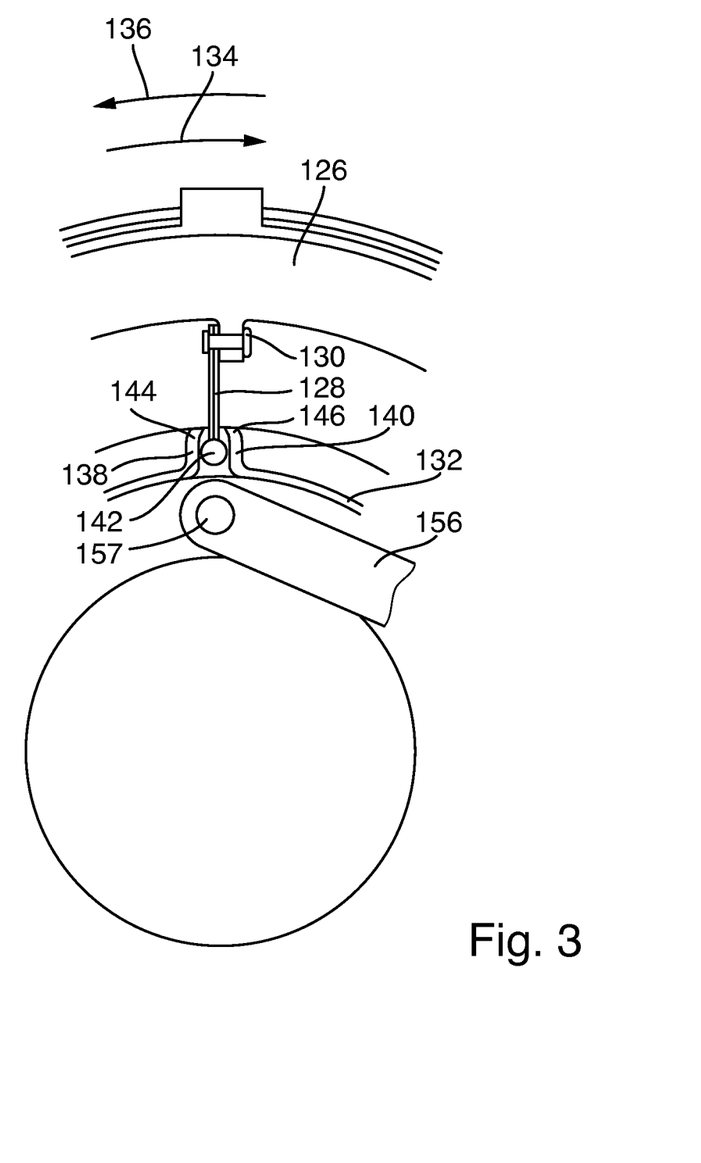
FIG. 3 is a back detail view of a portion of the torque converter of FIG. 2 taken generally in the direction of arrows 3-3.

The following description is made with reference to FIGS. 2-3. FIG. 2 is a cross section view of a torque converter including an inertia ring according to an example aspect. FIG. 3 is a back detail view of a portion of the torque converter of FIG. 2 taken generally in the direction of arrows 3-3. Torque converter 100 includes impeller 102, turbine 104 and stator 106 enclosed in a housing formed by impeller shell 108 and cover 110. Cover 110 includes drive plate 112 with stud 114 arranged for driving connection to a prime mover such as a combustion engine, for example. Turbine 104 includes shell 116 and hub 118 fixed together by rivet 120.

Converter 100 also includes damper 122. In an example embodiment, damper 122 is a tuned damper as will be described in more detail below. Damper 122 includes piston plate 124, inertia ring 126 and resilient element 128 fixed to the inertia ring by rivet 130. In an example embodiment, resilient element 128 is a radially extending leaf spring or plurality of leaf springs. Piston plate 124 includes pivot ring 132 and element 128 is frictionally engaged with the pivot ring as described below. Inertia ring 126 is rotatable in a circumferential direction (i.e., direction of arrows 134 and/or 136 in FIG. 3) relative to piston plate 124.

Pivot ring 132 includes radially extending tabs 138 and 140, and element 128 includes slide roll 142 with an outer circumference clamped by the pivot ring tabs. By slide roll, we mean a cylindrical element including a surface prepared for slipping engagement with tabs 138 and 140 with a minimal amount of wear. Slide roll 142 may include material and processing similar to a bearing roller. Roll 142 may be integral with element 128 or may be attached to element 128 using any means known in the art. Roll 142 may be fixed to element 128 by welding, staking, or crimping, for example. Tabs 138 and 140 include respective bent segments 144 and 146 extending toward one another to limit radial displacement of slide roll 142.

Clutch plate 148 is drivingly engaged with cover 110 through clutch carrier 150, and clutch plate 152 includes circumferential ring 153 with an aperture drivingly engaged with piston radial tab 154. Together, cover 110, piston 124, and clutch plates 148 and 152 form a lockup clutch for torque converter 100 that is engaged by hydraulic pressure as is known in the art. Piston 124 is drivingly engaged with turbine 104 through leaf spring 156 and rivet 157 so that, when the clutch is engaged, torque is transmitted from cover 110 through the clutch to turbine 104 and hub 118. Hub 118 is arranged for driving connection to a transmission input shaft (not shown).

Figure 4:
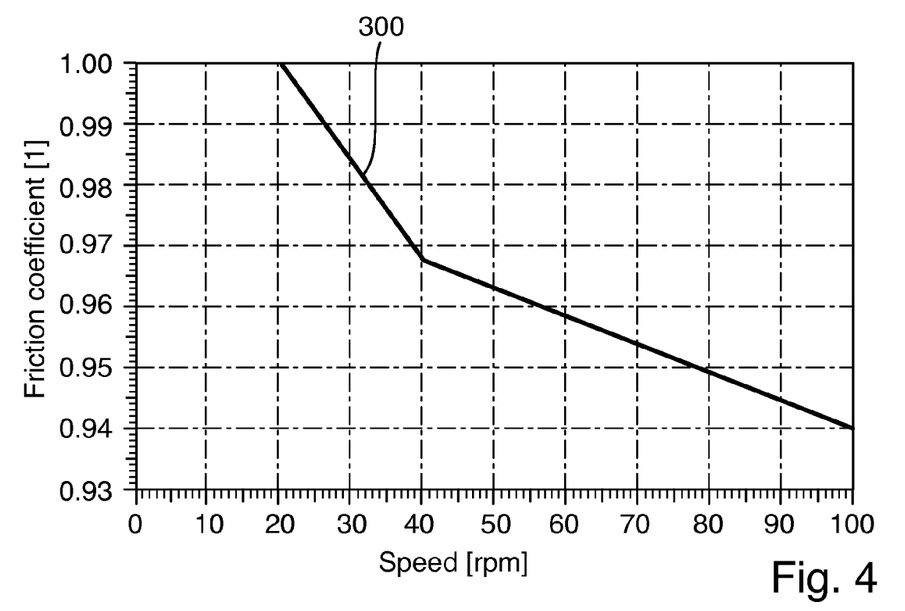
FIG. 4 is an example plot of friction coefficient vs. slip speed.
Figure 5:
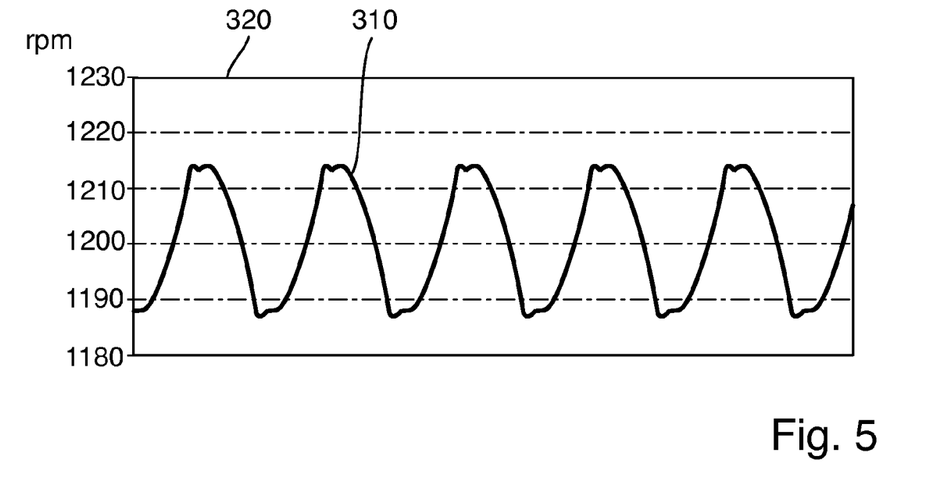
FIG. 5 is a simulated plot of rotational speed vs. time for a piston plate during a drivetrain shudder event.

Operation of damper 122 will now be described. Damper 122 is designed to limit or eliminate shudder during slipping clutch operation. A sliding coefficient of friction can vary for different slip speeds during clutch operation. FIG. 4 is an example plot of friction coefficient vs. slip speed. The coefficient is indicated by line 300. This changing coefficient can excite natural frequencies of the drivetrain. As the coefficient changes, the transmitted torque changes, exciting the drivetrain and leading to shudder in particularly sensitive drivetrains. FIG. 5 is a simulated plot of rotational speed vs. time for a piston plate during a drivetrain shudder event. Piston speed 310 varies from approximately 1185 RPM to 1215 RPM during the event. Engine speed 320 is constant at 1230 RPM.

Figure 6:
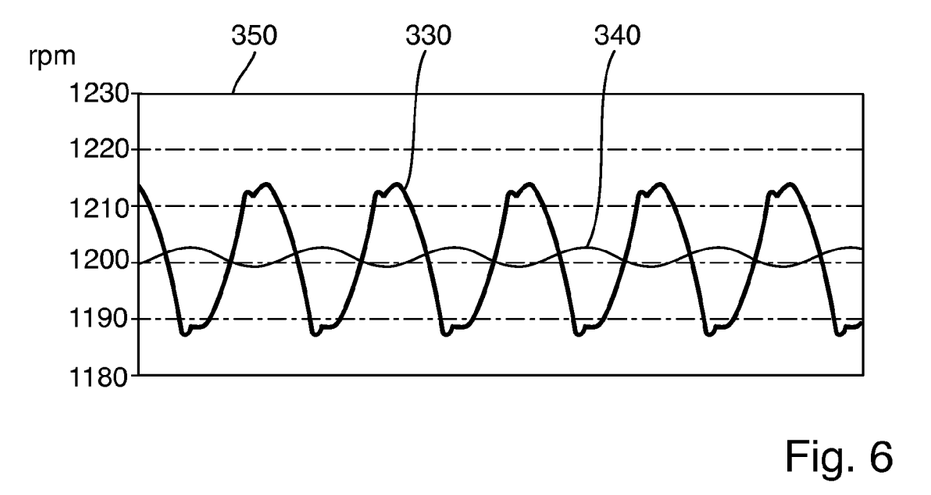
FIG. 6 is a simulated plot of rotational speed vs. tune for a piston plate and an inertia ring without friction during a drivetrain shudder event.

FIG. 6 is a simulated plot of rotational speed vs. time for a piston plate and an inertia ring without friction during a drivetrain shudder event. Piston speed 330 shows slightly less variation over time. Inertia ring speed 340 is out of phase with the piston speed. That is, as the piston plate rotational speed is increasing, the inertia ring rotational speed is decreasing. By selecting a particular inertia for ring 126 and torsional spring rate of element 128, the natural frequency of the inertia ring can be set below the shudder frequency and the inertia ring will oscillate out of phase with the piston plate. Engine speed 350 is constant at 1230 RPM.

Figure 7:
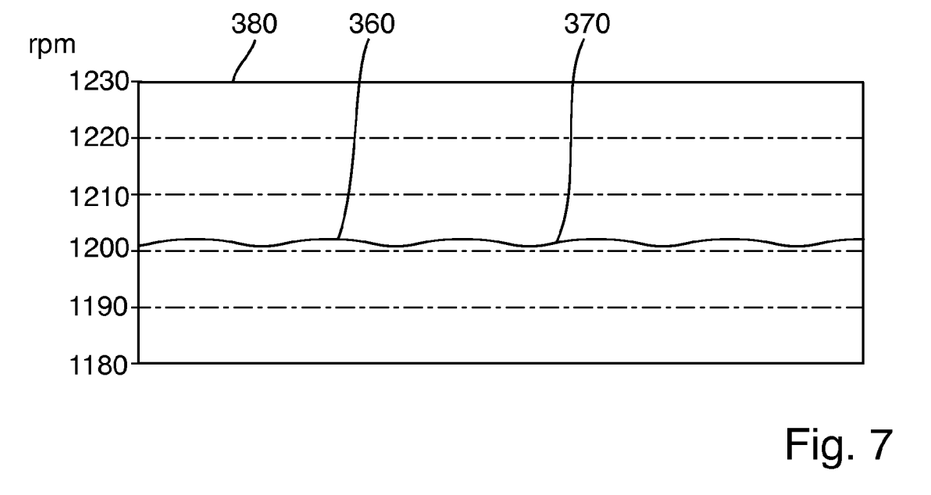
FIG. 7 is a simulation of rotational speed vs. time for a piston plate and an inertia ring with friction during a drivetrain shudder event.

FIG. 7 is a simulation of rotational speed vs. time for a piston plate and an inertia ring with friction during a drivetrain shudder event. The friction results from the clamping of slide roll 142 by tabs 138 and 140. Here piston plate 124 and inertia ring 126 oscillate at approximately the same speed (lines 360 and 370, respectively), but the slide roll friction dissipates energy during each oscillation so that the overall speed variation is much lower. This type of damper is sometimes referred to as a Lanchester or friction type absorber. Engine speed 380 is constant at 1230 RPM.

Figure 8:
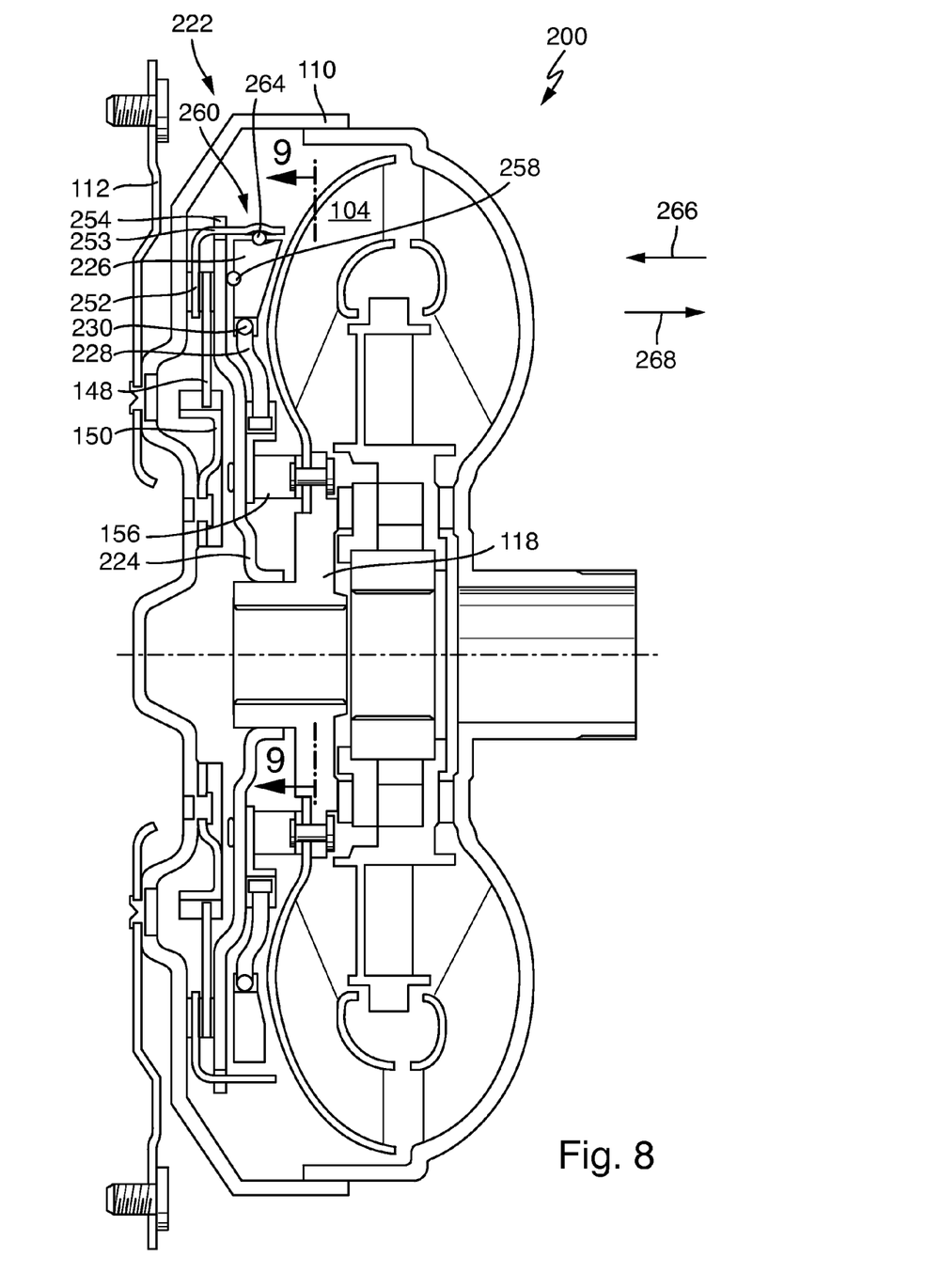
FIG. 8 is a cross section view of a torque converter including an inertia ring according to an example aspect.
Figure 9:
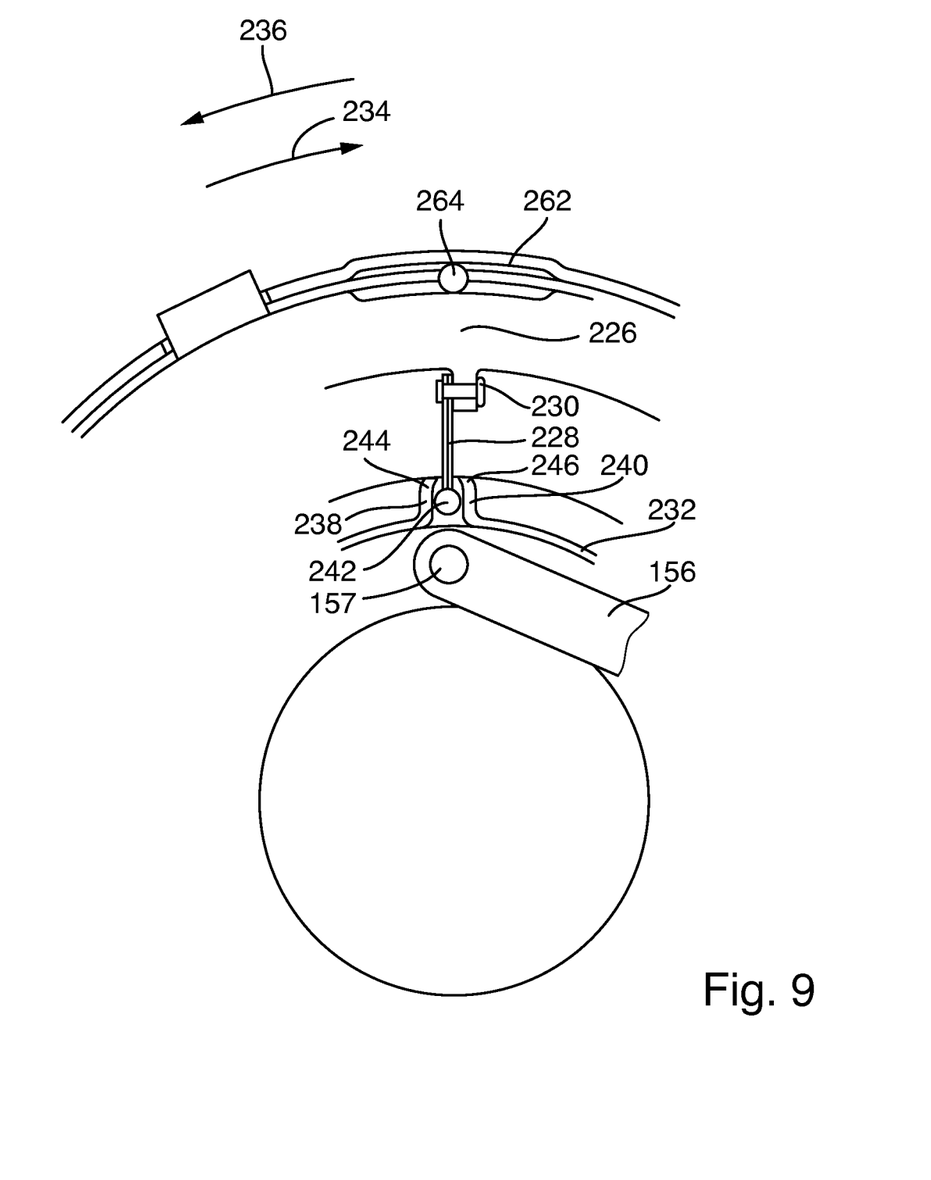
FIG. 9 is a back detail view of a portion of the torque converter of FIG. 8 taken generally in the direction of arrows 9-9.

The following description is made with reference to FIGS. 8-9. FIG. 8 is a cross section view of a torque converter including an inertia ring according to an example aspect. FIG. 9 is a back detail view of a portion of the torque converter of FIG. 8 taken generally in the direction of arrows 9-9. Torque converter 200 is generally similar to torque converter 100 except as indicated below.

Converter 200 includes damper 222. In an example embodiment, damper 222 is a tuned damper with clamping as will be described in more detail below. Damper 222 includes piston plate 224, inertia ring 226 and resilient element 228 fixed to the inertia ring by rivet 230. In an example embodiment, resilient element 228 is a radially extending leaf spring or plurality of leaf springs. Piston plate 224 includes pivot ring 232 and element 228 is frictionally engaged with the pivot ring as described below. Inertia ring 226 is rotatable in a circumferential direction (i.e., direction of arrows 234 and/or 236 in FIG. 9) relative to piston plate 224.

Pivot ring 232 includes radially extending tabs 238 and 240, and element 228 includes slide roll 242 with an outer circumference clamped by the pivot ring tabs. Roll 242 may be integral with element 228 or may be attached to element 228 using any means known in the art. Roll 242 may be fixed to element 228 by welding, staking, or crimping, for example. Tabs 238 and 240 include respective bent segments 244 and 246 extending toward one another to limit radial displacement of slide roll 242.

Clutch plate 148 is drivingly engaged with cover 110 through clutch carrier 150, and clutch plate 252 includes circumferential ring 253 with an aperture drivingly engaged with piston radial tab 254. Together, cover 110, piston 224, and clutch plates 148 and 252 form a lockup clutch for torque converter 200 that is engaged by hydraulic pressure as is known in the art. Piston 224 is drivingly engaged with turbine 104 through leaf spring 156 and rivet 157 so that, when the clutch is engaged, torque is transmitted from cover 110 through the clutch to turbine 104 and hub 118. Hub 118 is arranged for driving connection to a transmission input shaft (not shown).

Damper 222 includes ball 258 and ball ramp assembly 260. Ball 258 is disposed axially between piston plate 224 and inertia ring 226. Ball ramp assembly 260 includes ball ramp 262 and ball 264. Ramp 262 is partially disposed on clutch plate ring 253 and partially disposed on inertia ring 226. In an example embodiment (not shown), the ball ramp may be entirely contained within plate 252 or ring 226. By ball ramp, we mean a channel with an axial and circumferential displacement, so that a ball rolling in the channel is axially displaced as it is moved in a circumferential direction. Ball 264 is disposed in ramp 262 radially between ring 226 and clutch plate ring 253.

Ramp 262 is arranged to apply an axial force to piston plate 224 through ball 258 when inertia ring 226 rotates relative to clutch plate 252. That is, during a slipping of the clutch, inertia ring 226 tries to maintain a constant speed, but the coefficient of friction for the clutch may vary as slip speed changes, so a rotational speed of plate 252 may speed up and slow down relative to ring 226. During these situations, ball 264 is circumferentially displaced and axially displaced in ramp 262. Axial displacement of the ball relative to plate 252 and ring 226 urges the two towards one another (i.e., ring 226 is urged in direction of arrow 266 and plate 252 is urged in direction of arrow 268). Ring 226 pushes ball 258 towards piston 224, applying force to the piston so that plate 148 is clamped tighter by the piston and plate 252. In some example embodiments, ball ramp 262 is configured such that the piston plate is not displaced by relative rotation of the inertia ring in one direction (i.e., direction of arrow 134 in FIG. 3). For example, the ramp may be purely circumferential in one direction, but may guide the ball in both circumferential and axial directions in the opposite direction.

Figure 10:
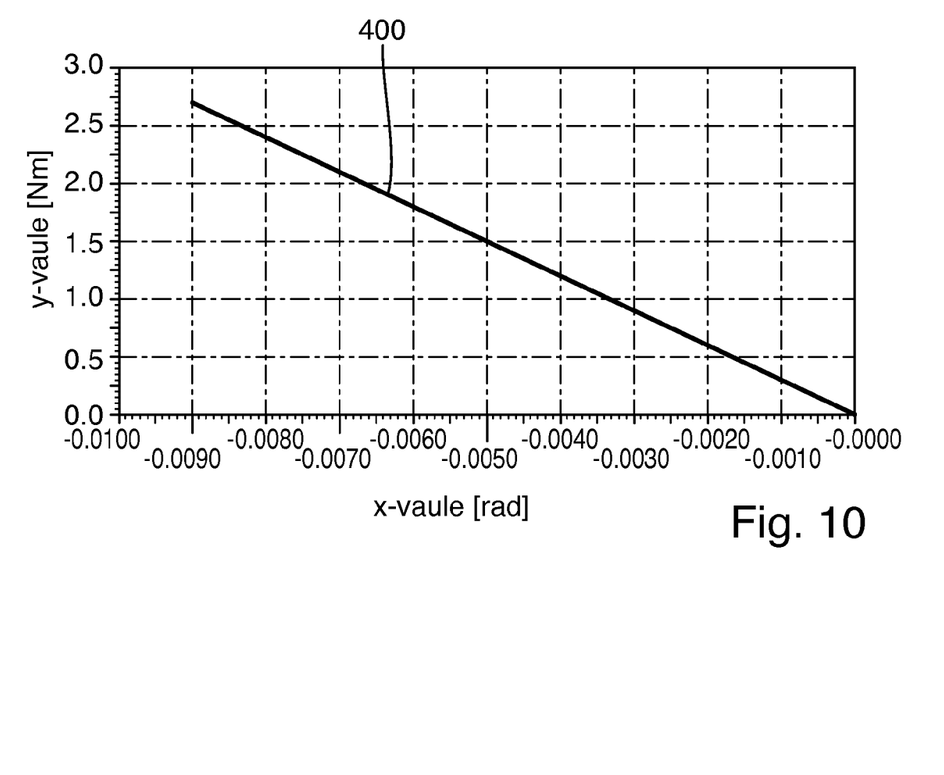
FIG. 10 is an example plot of a clamping torque of a ball ramp assembly vs. relative rotation of an inertia ring.
Figure 11:
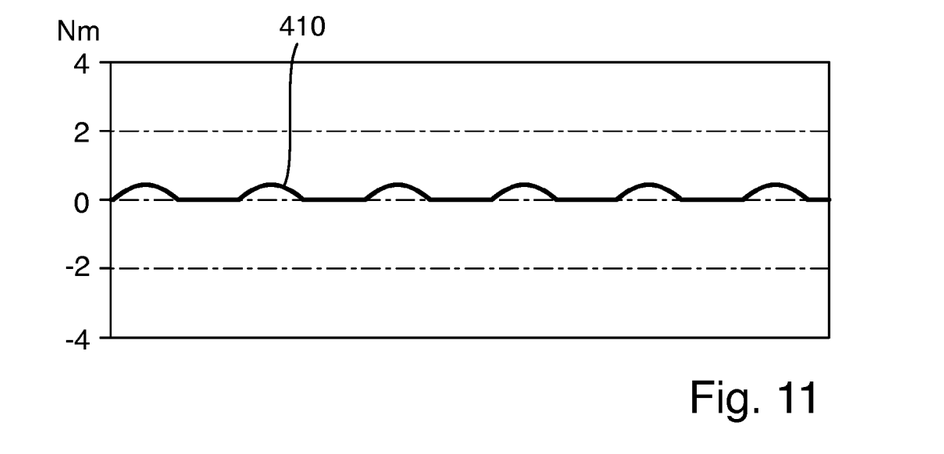
FIG. 11 is a plot of clamping torque vs. time.

Operation of damper 222 will now be described. In general, operation of damper 222 is similar to damper 122 except as indicated below. FIG. 10 is an example plot of a clamping torque of ball ramp assembly 260 vs. relative rotation of inertia ring 226. The torque is shown by line 400. In this configuration, the torque only increases in one direction (i.e., from 0.0000 to −0.0100 radians)—there is no clamping effect in the other direction. FIG. 11 is a plot of the clamping torque during the simulation. Curve 410 is a plot of the clamping torque that results from periods of relative speed between the inertia ring and the clutch plate.

Figure 12:
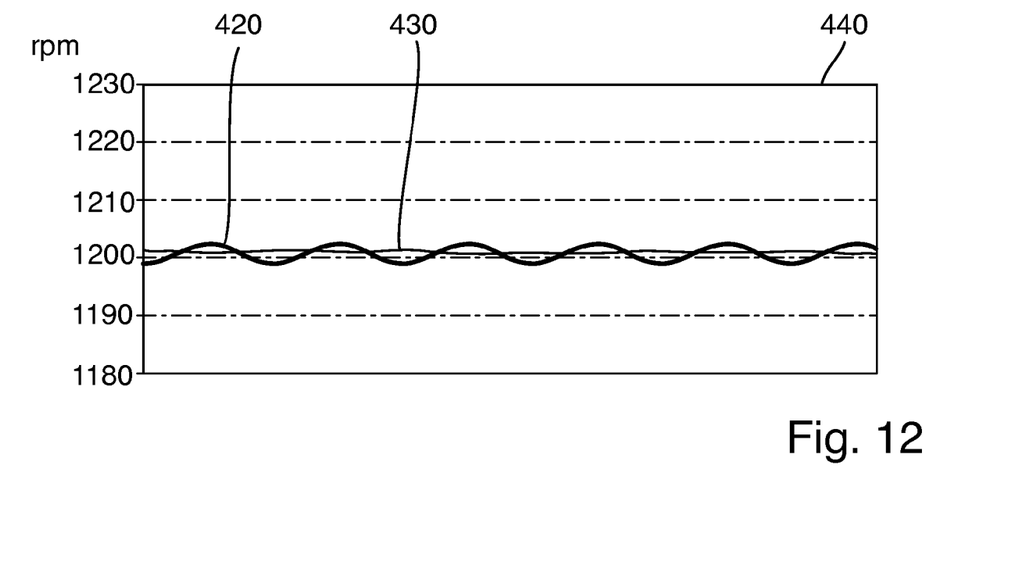
FIG. 12 is a simulated plot of rotational speed vs. time for a piston plate and an inertia ring during a drivetrain shudder event.

FIG. 12 is a simulated plot of rotational speed vs. time for a piston plate and an inertia ring during a drivetrain shudder event. Piston speed 420 shows less speed variation than speed 330 in FIG. 6, and inertia ring speed 430 is nearly constant due to the ball ramp. Engine speed 440 is constant at 1230 RPM.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A tuned damper for a torque converter comprising:
    a piston plate including a pivot ring, the pivot ring including a pair of radially extending tabs;
    an inertia ring at least partially rotatable in a circumferential direction relative to the piston plate; and,
    a resilient element:
        fixed to the inertia ring and frictionally engaged with the piston plate pivot ring; and,
        including a slide roll clamped by the pair of radially extending tabs.

2. A tuned damper for a torque converter comprising:
    a piston plate including a pivot ring;
    an inertia ring at least partially rotatable in a circumferential direction relative to the piston plate; and,
    a resilient element fixed to the inertia ring and frictionally engaged with the piston plate pivot ring, wherein:
        the pivot ring includes a pair of radially extending tabs;
        the resilient element includes a radially-extending leaf spring fixed to a slide roll; and,
        an outer circumference of the slide roll is clamped by the pivot ring tabs.

3. The tuned damper of claim 2 wherein the pivot ring tabs each include respective distal bent segments extending toward one another to limit radial displacement of the slide roll.

4. The tuned damper of claim 2, wherein an inertia of the inertia ring and a torsional spring rate of the resilient element are selected so that a natural frequency of the inertia ring is less than a shudder frequency.

5. The tuned damper of claim 2 further comprising:
   a first ball disposed axially between the piston plate and the inertia ring;
   a first clutch plate including a ring; and,
   a ball ramp assembly including:
      a ball ramp disposed on the inertia ring and/or the first clutch plate ring; and,
      a second ball disposed in a second ball ramp radially between the inertia ring and the first clutch plate ring.

6. The tuned damper of claim 5 wherein the piston plate includes a radial tab drivingly engaged with the first clutch plate ring.

7. The tuned damper of claim 5 wherein the ball ramp assembly is arranged to apply an axial force to the piston plate through the first ball when the inertia ring rotates relative to the first clutch plate.

8. The tuned damper of claim 7 further comprising a second clutch plate disposed axially between the first clutch plate and the piston plate, wherein the piston plate axial force clamps the second clutch plate between the first clutch plate and the piston plate.

9. The tuned damper of claim 2 further comprising a turbine rotatably connected to the piston plate by leaf springs.

10. A torque converter comprising:
    a turbine; and,
    a tuned damper including:
       a piston plate rotatably connected with the turbine and including a pivot ring;
       an inertia ring; and,
       a radial leaf spring fixed to the inertia ring and frictionally engaged with the piston plate pivot ring, wherein:
          the pivot ring includes first and second radially extending tabs;
          the radial leaf spring is fixed to a slide roll; and,
          the slide roll is disposed circumferentially between and frictionally engaged with the first and second tabs.

11. The torque converter of claim 10 wherein the turbine is rotatably connected to the piston plate by leaf springs.

12. The torque converter of claim 10 further comprising:
    a first ball disposed axially between the piston plate and the inertia ring;
    a first clutch plate including a ring; and,
    a ball ramp assembly including:
       a ball ramp disposed on the inertia ring and/or the first clutch plate ring; and,
       a second ball disposed in a second ball ramp radially between the inertia ring and the first clutch plate ring.

13. The torque converter of claim 12 wherein the piston plate includes a radial tab drivingly engaged with the first clutch plate ring.

14. The torque converter of claim 12 wherein the ball ramp assembly is arranged to apply an axial force to the piston plate through the first ball when the inertia ring rotates relative to the first clutch plate.

15. The torque converter of claim 14 further comprising a second clutch plate disposed axially between the first clutch plate and the piston plate, wherein the piston plate axial force clamps the second clutch plate between the first clutch plate and the piston plate.

16. The torque converter of claim 10, wherein the piston plate includes a piston radial tab, the torque converter further comprising:
    a cover including a clutch carrier;
    a first clutch plate drivingly engaged with the clutch carrier; and,
    a second clutch plate disposed axially between the first clutch plate and the cover, and drivingly engaged with the piston radial tab.

17. The torque converter of claim 16, wherein the second clutch plate includes a ring, the torque converter further comprising:
    a first ball disposed axially between the piston plate and the inertia ring;
    a ball ramp assembly including:
       a first ball ramp disposed on the inertia ring and/or the second clutch plate ring; and,
       a second ball disposed in a second ball ramp radially between the inertia ring and the second clutch plate ring.

* * * * *